United States Patent
Cao et al.

(10) Patent No.: US 9,776,619 B2
(45) Date of Patent: Oct. 3, 2017

(54) DRIVING ASSISTANCE APPARATUS

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Junmin Cao, Kariya (JP); Haruki Oguri, Toyota (JP)

(73) Assignees: DENSO CORPORATION, Kariya (JP); TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 14/941,725

(22) Filed: Nov. 16, 2015

(65) Prior Publication Data
US 2016/0144861 A1 May 26, 2016

(30) Foreign Application Priority Data
Nov. 26, 2014 (JP) ................. 2014-238978

(51) Int. Cl.
*B60W 20/00* (2016.01)
*B60W 20/12* (2016.01)
*B60W 30/18* (2012.01)
*B60W 20/14* (2016.01)

(52) U.S. Cl.
CPC ............ *B60W 20/12* (2016.01); *B60W 20/14* (2016.01); *B60W 30/181* (2013.01); *B60W 30/18127* (2013.01); *B60W 2520/105* (2013.01); *B60W 2540/10* (2013.01); *B60W 2550/142* (2013.01); *B60W 2550/143* (2013.01); *B60W 2550/402* (2013.01); *B60W 2710/083* (2013.01); *B60W 2720/103* (2013.01); *B60W 2720/106* (2013.01); *Y02T 10/7258* (2013.01)

(58) Field of Classification Search
CPC combination set(s) only.
See application file for complete search history.

(56) References Cited

U.S. PATENT DOCUMENTS

2014/0285331 A1* 9/2014 Otake .................. G08G 1/16
340/435
2015/0019057 A1* 1/2015 Morisaki ................. B60L 7/18
701/22

(Continued)

FOREIGN PATENT DOCUMENTS

JP 2014-110677 A 6/2014

*Primary Examiner* — John R Olszewski
*Assistant Examiner* — James M McPherson
(74) *Attorney, Agent, or Firm* — Posz Law Group, PLC

(57) ABSTRACT

A driving assistance apparatus, which executes a regeneration increasing control, includes a stop position specifying unit specifying a stop position, a calculation unit calculating a predetermined position at which a speed of the vehicle reduces to a predetermined speed, a determination unit determining a start point of a deceleration distance as a notification position when a distance between an end point of the deceleration distance and the predetermined position satisfies a predetermined condition, a notification unit notifying the driver to turn off the accelerator, and a regeneration control unit starting the regeneration increasing control when the vehicle has travelled the distance that satisfies the predetermined condition from the notification position.

6 Claims, 2 Drawing Sheets

(56) References Cited

U.S. PATENT DOCUMENTS

| | | | |
|---|---|---|---|
| 2015/0019097 A1* | 1/2015 | Morisaki | B60L 7/18 |
| | | | 701/70 |
| 2015/0224995 A1* | 8/2015 | Yamaoka | B60W 10/04 |
| | | | 702/141 |
| 2015/0298699 A1 | 10/2015 | Poechmueller et al. | |
| 2016/0101698 A1* | 4/2016 | Grundherr | B60W 50/14 |
| | | | 701/70 |
| 2016/0264003 A1* | 9/2016 | Yokoyama | B60K 6/52 |

* cited by examiner

DRIVING ASSISTANCE APPARATUS

CROSS REFERENCE TO RELATED APPLICATION

This application is based on Japanese Patent Application No. 2014-238978 filed on Nov. 26, 2014, the disclosure of which is incorporated herein by reference.

TECHNICAL FIELD

The present disclosure relates to a driving assistance apparatus that performs a regeneration increasing control during a deceleration of a vehicle so that regenerated electric power can be acquired when a stop position exists ahead of the vehicle at a turn-off time of an accelerator of the vehicle.

BACKGROUND

JP 2014-110677 A discloses a driving assistance apparatus that performs a regeneration increasing control during a deceleration of a vehicle so that increased regenerated power can be acquired when stop position exists ahead of the vehicle at a turn-off time of an accelerator of the vehicle. The apparatus disclosed in JP 2014-110677 A includes a speed-distance map that stores a relationship between the most appropriate vehicle speed for starting the regeneration increasing control after the turn-off of the accelerator and a remaining distance to the stop position as an assistance execution line of the regeneration increasing control. The speed-distance map also includes an accelerator off allowable line and a regenerated power overflow line. The accelerator off allowable line indicates an allowable limit of the remaining distance at which the driver feels the turn-off of the accelerator is too early in a case where the driver has turned off the accelerator at a certain speed and moves toward the stop position with the regeneration increasing control being executed. The regenerated power overflow line indicates a limit of the remaining distance at which the overflow amount of the regenerated power does not exceed a predetermined value when the driver depresses the brake pedal after turning off the accelerator at a certain speed.

In JP 2014-110677 A, when the stop position is detected, an accelerator off position at which the accelerator should be turned off is calculated based on the speed of the vehicle by referring to the assistance execution line included in the speed-distance map. When the vehicle moves to a position, which is apart from the accelerator off position by a predetermined distance, before arriving at the accelerator off position, or when the current time is earlier than an estimated arrival time to the accelerator off position by a predetermined period, the driver is provided with the driving assistance information that instructs the turn-off of the accelerator. When the vehicle moves to the accelerator off position after turn off of the accelerator is notified to the driver or when the predetermined period has elapsed after the instruction for turning off of the accelerator is notified to the driver, the apparatus activates the regeneration increasing control. After the execution of the regeneration increasing control, a relationship between the vehicle speed and the remaining distance should be monitored for determining whether the relationship is included in the assistance execution region that is sandwiched between the accelerator off allowable line and the regenerated power overflow line. When the timely monitored relationship between the vehicle speed and the remaining distance is determined to go beyond of the assistance execution region, the apparatus stops or deactivates the regeneration increasing control.

In the apparatus disclosed in JP 2014-110677 A, the assistance execution line needs to be preliminarily defined and stored in the speed-distance map. Thus, when a slope of a road surface on which the vehicle travels is different from an assumed slope under which the assistance execution line is defined, a position for starting or activating the regeneration increasing control cannot be properly specified. Further, in this case, even when the regeneration increasing control is activated, the relationship between the vehicle speed and the remaining distance to the stop position easily exceeds from the assistance execution region. When the relationship between the vehicle speed and the remaining distance exceeds from the assistance execution region, the regeneration increasing control is deactivated. Thus, an increase in deactivation frequency of the regeneration increasing control may give an uncomfortable feeling to the driver.

SUMMARY

In view of the foregoing difficulties, it is an object of the present disclosure to provide a driving assistance apparatus that starts a regeneration increasing control at a proper position regardless of a slope of a road surface on which the vehicle travels.

According to an aspect of the present disclosure, a driving assistance apparatus, which executes a regeneration increasing control, includes a stop position specifying unit, a calculation unit, a determination unit, a notification unit, and a regeneration control unit. The stop position specifying unit specifies a stop position, which is disposed on a travelling road ahead of a vehicle and requires a stop of the vehicle. The calculation unit calculates a predetermined position at which a speed of the vehicle reduces to a predetermined speed for stopping at the stop position. The determination unit calculates a deceleration distance necessary for the vehicle to decelerate from a present speed to the predetermined speed with consideration of a slope of a surface of the travelling road on a premise that a regeneration increasing control is carried out after an accelerator of the vehicle is turned off. The determination unit further determines a start point of the deceleration distance as a notification position when a distance between an end point of the deceleration distance and the predetermined position satisfies a predetermined condition. The notification position is a position where a notification for turning off of the accelerator is to be carried out to the driver. The notification unit notifies the driver to turn off the accelerator when the vehicle arrives at the notification position. The regeneration control unit starts the regeneration increasing control when the vehicle has travelled the distance that satisfies the predetermined condition from the notification position. The regeneration control unit executes the regeneration increasing control in response to the turning off of the accelerator in a case where the stop position is disposed ahead of the vehicle to increase an electric power regenerated by a deceleration of the vehicle compared with a case where the stop position does not exist ahead of the vehicle.

With the above apparatus, the regeneration increasing control can be started at a proper position and proper timing regardless of a slope of a road surface on which the vehicle travels.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

The following will describe an embodiment of the present disclosure with reference to the accompanying drawings. The following will describe an embodiment in which the driving assistance apparatus is applied to a hybrid vehicle. Herein, hybrid vehicle is a vehicle that has an engine and a motor generator as power source. The driving assistance apparatus according to the present disclosure may also be applied to an electric vehicle that has only a motor generator as power source.

Figure 1:
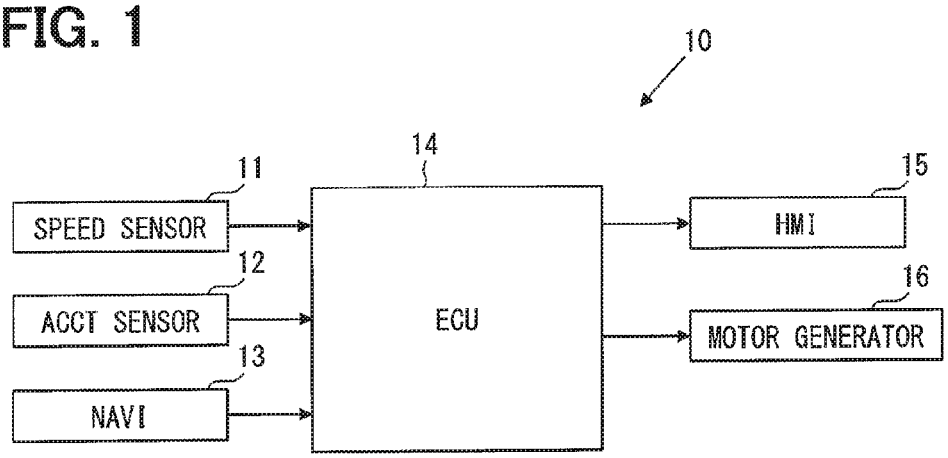
FIG. 1 is a block diagram showing a configuration of a driving assistance apparatus according to an embodiment of the present disclosure.

FIG. 1 is a block diagram showing a configuration of the driving assistance apparatus 10 according to the present embodiment. As shown in FIG. 1, the driving assistance apparatus 10 includes a speed sensor 11, an accelerator pedal sensor (ACCT SENSOR) 12, a navigation device (NAVI) 13, and an electronic control unit (ECU) 14. The driving assistance apparatus 10 acquires a traveling state of the vehicle using the speed sensor 11, acquires a driving state of the vehicle using the accelerator pedal sensor 12, and acquires information of the travelling road using the navigation device 13.

The speed sensor 11 detects a speed of the vehicle and outputs a speed detection signal corresponding to the speed of the vehicle. The accelerator pedal sensor 12 detects a depressed amount of the accelerator pedal, and outputs a depression amount detection signal corresponding to the depressed amount of the accelerator pedal. Based on the depression amount detection signal, a release of the accelerator pedal to a state in which the depression amount is equal to zero can be detected. The detection signals output from the speed sensor 11 and the accelerator pedal sensor 12 are input to the ECU 14. The speed detection signal and the depression amount detection signal may also be provided by different ECUs which directly receive the detection signals from the sensors. In this case, the ECU 14 of the driving assistance apparatus 14 performs a communication with the different ECUs to acquire the detection signals.

As is well known, the navigation device 13 displays a present position of the vehicle on the road map or performs a route guidance to a destination. Usually, the navigation device 13 includes various kinds of sensors and a display device. The navigation device 13 also includes a map database in which data of the road map and various kinds of facilities are stored. In the map database, temporary stop lines, railroad crossings, pedestrian crossings, T-shaped crossings are stored as stop positions. At each stop position, the vehicle performs the regeneration increasing control while reducing the speed. Thus, at each stop position, an assistance providing zone is defined for supporting a stop of the vehicle at the stop position. The assistance providing zone is stored in the map database in association with the corresponding stop position. The ECU 14 of the driving assistance apparatus 10 is able to acquire information related to the present position of the vehicle, the stop position and the corresponding assistance providing zone from the navigation device 13.

The information related to the stop position that requires a stop of the vehicle may also be acquired in a different manner instead of or in addition to using the navigation device 13. For example, a camera equipped to the vehicle may capture images around the vehicle. In this case, the stop position may be acquired by analyzing the images captured by the camera. For example, when a traffic signal of red, a road sign requiring a temporary stop, a pedestrian crossing, or a railroad crossing is recognized by analyzing the images captured by the camera, the recognized above-described objects may be defined as the stop positions. For another example, the vehicle may be equipped with a communication device that performs a road side to vehicle communication. In this case, the vehicle may receive the information related to the stop positions from the road side device via the road side to vehicle communication, and acquire the information of the stop position.

The map database of the navigation device 13 stores road data in association with the slope data of the road surface. Thus, the ECU 14 is able to acquire, from the navigation device 13, data indicating the road surface slope of the travelling road from the present position of the vehicle to the stop position. As another example, the vehicle may also be equipped with a slope sensor that detects a slope of the road surface of the travelling road. The slope sensor may be provided by an acceleration sensor having a detection axis in a vertical direction. Using this kind of slope sensor, the slope of the road surface from the present position of the vehicle to the stop position can be detected. Usually, the slope sensor only detects a slope of the road surface on which the vehicle is travelling. Thus, the slope from the present position to the stop position is considered to be equal to the presently detected slope of the road surface. In this case, the slope sensor may be configured to transmit the detected slope of the road surface to the navigation device 13, and the navigation device 13 stores the slope of the road surface in association with the road data. In this way, the navigation device 13 may learn the slope of the road surface. With this configuration, the road surface slope data are accumulated with a travelling of the vehicle. Thus, accuracy for calculating the road surface slope can be improved.

The ECU 14 of the driving assistance apparatus 10 is provided by a well-known microcomputer, and includes a central processing unit (CPU), a read only memory (ROM), a random access memory (RAM), and input/output (I/O). In the microcomputer, the CPU executes programs stored in the ROM for performing various kinds of processes. The driving assistance apparatus 10 further includes a human machine interface (HMI) device 15 and a motor generator 16. The CPU of the microcomputer performs a process to control the HMI device 15 and the motor generator 16. More specifically, based on the signals or information acquired by the speed sensor 11, the accelerator pedal sensor 12, and the navigation device 13, the ECU 14 controls the HMI device 15 and the motor generator 16 to provide the driving assistance for stopping the vehicle at the stop position. As the driving assistance, the ECU 14 instructs the driver to release the accelerator pedal for turning off the accelerator, and executes the regeneration increasing control for increasing the power regenerated by the motor generator 16. The details of the driving assistance provided by the ECU 14 will be described later.

The HMI device 15 includes a display device and/or speaker equipped in a compartment of the vehicle. The HMI device 15 may output visual information on the display device or output audio information through the speaker in response to an instruction from the ECU 14. In this way, the HMI device 15 provides the driving assistance information to the driver. Herein, the visual information may include images, text messages, or characters, and the audio information may include notification speech and notification sound. When the stop position exists ahead of the vehicle, the ECU 14 determines a time for instructing the driver to turn off the accelerator, and outputs a command for controlling the HMI device 15 to provide driving assistance information. Herein, the driving assistance information instructs the driver to release the accelerator pedal. When the HMI device 15 receives the command from the ECU 14, the HMI device 15 notifies the driver to release the accelerator pedal by outputting the visual information or the audio information. The display device and the speaker of the HMI device 15 may be provided by the display device and the speaker of the navigation device 13.

For starting the engine in a high-efficiency condition, the motor generator 16 supplies power for starting the vehicle or supplies power, which is generated by the engine, to the acceleration of the vehicle. During deceleration of the vehicle, the motor generator 16 converts mechanical energy, which is also known as kinetic energy, to the electric energy. Thus, the electric power is regenerated by the motor generator 16. The ECU 14 controls the regeneration of the electric power by the motor generator 16. For example, when the driver turns off the accelerator by releasing the accelerator pedal, the ECU 14 considers that the driver intends to reduce the speed of the vehicle and performs the regeneration control to the motor generator 16 for regenerating the electric power. When the stop position exists ahead of the vehicle, the ECU 14 executes the regeneration increasing control to increase the regenerated electric power compared with a case in which the stop position does not exist ahead of the vehicle.

Suppose that the time to turn off the accelerator by releasing the accelerator pedal is freely handled by the driver. In this case, a delayed turn-off of the accelerator may cause a decrease in deceleration distance and the electric power may not be adequately regenerated even though the stop position exists ahead of the vehicle. In the driving assistance apparatus 10 according to the present embodiment, the ECU 14 determines a time for notifying the turn-off of the accelerator to the driver so that the regenerated electric power is adequately obtained by the regeneration increasing control. Hereinafter, the time for notifying the turn-off of the accelerator is also referred to as accelerator-off notification time. When the accelerator-off notification time comes, the ECU 14 controls the HMI device 15 to notify, to the driver, the turning off of the accelerator, that is, the release of the accelerator pedal. When the driver turns off the accelerator in response to the notification, the period for executing the regeneration increasing control is secured and the electric power can be regenerated adequately by the motor generator 16. Further, the deceleration of the vehicle generated by the regeneration increasing control can effectively and properly reduce the speed of the vehicle and properly stop the vehicle at the stop position.

Figure 2:
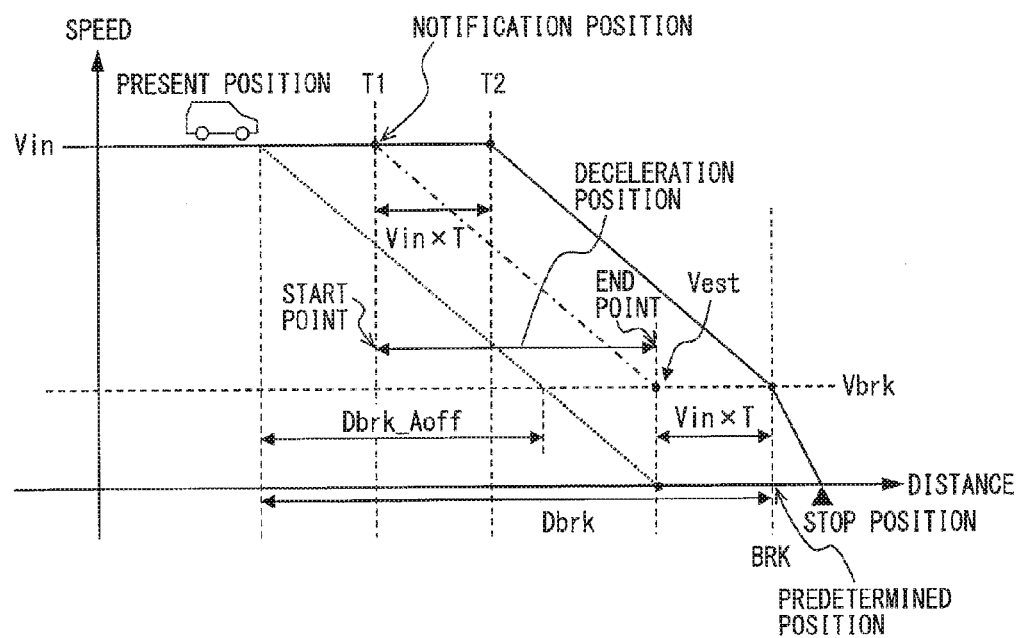
FIG. 2 is a diagram showing an example of accelerator off notification time, start time of regeneration increasing control, and vehicle speed change when the driving assistance is performed for notifying the driver to turn off the accelerator and executing the regeneration increasing control.
Figure 3:
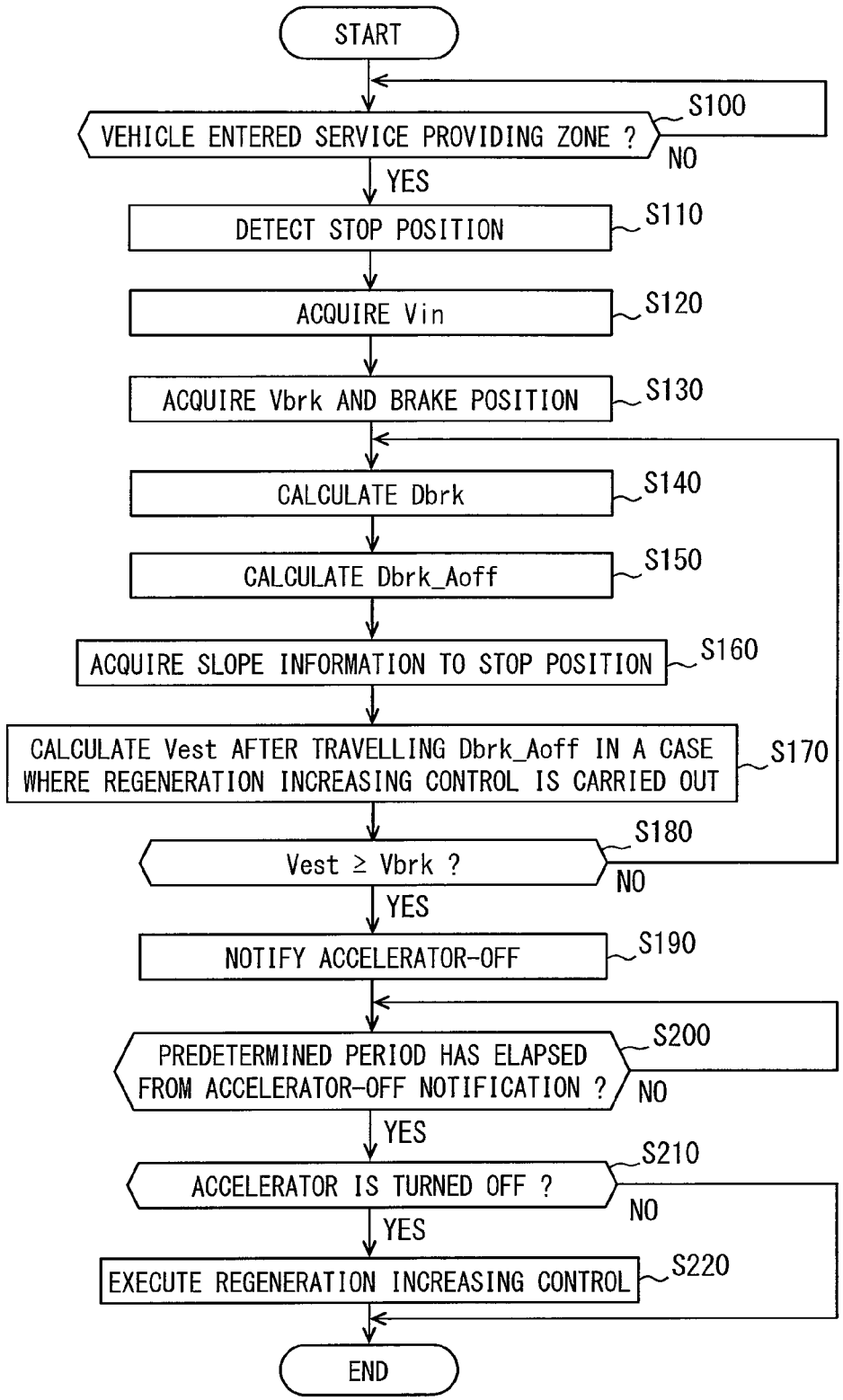
FIG. 3 is a flowchart showing a process executed by an electronic control unit of the driving assistance apparatus for providing the driving assistance.

The following will describe the driving assistance executed by the ECU 14 with reference to FIG. 2 and FIG. 3. FIG. 2 is a diagram showing an operation of the ECU 14 and the corresponding vehicle state, and FIG. 3 is a flowchart showing a process executed by the ECU 14 for providing the driving assistance. FIG. 2 is an example that shows the accelerator-off notification time, a start time of the regeneration increasing control, and vehicle speed change when the driving assistance is provided by the ECU 14. Herein, the driving assistance includes the notification for turning off of the acceleration and the regeneration increasing control. Hereinafter, the turning off of the accelerator is also referred to as accelerator-off.

As shown in FIG. 3, at S100, the ECU 14 determines whether the vehicle has entered the assistance providing zone based on the information indicating the present position of the vehicle and the assistance providing zone. The information indicating the present position of the vehicle and the assistance providing zone is acquired from the navigation device 13. When the ECU 14 determines that the vehicle has entered the assistance providing zone, the ECU 14 proceeds to S110. When the ECU 14 determines that the vehicle has not yet entered the assistance providing zone, the ECU 14 waits until the vehicle enters the assistance providing zone. In a case where the stop position is detected in a different manner other than using the navigation device 13, the process at S100 may be omitted.

At S110, the ECU 14 specifies the stop position (STOP) that requires a stop of the vehicle. The stop position is ahead of the vehicle on the road along which the vehicle is travelling.

At S120, the ECU 14 calculates a speed Vin of the vehicle at the entering point of the assistance providing zone based on the speed detection signal output from the speed sensor 11. The speed of the vehicle at the entering point of the assistance providing zone is also referred to as a present speed.

At S130, the ECU 14 specifies a brake speed Vbrk based on the vehicle speed Vin obtained at S120. Then, the ECU 14 specifies a brake position based on the brake speed Vbrk. An example of the vehicle speed Vin, the brake speed Vbrk, and the brake position (BRK) is shown in FIG. 2.

The brake speed Vbrk is a speed of the vehicle at a time when the brake of the vehicle is activated and a braking force is generated for stopping the vehicle at the stop position. The brake speed Vbrk is specified or estimated based on the vehicle speed Vin obtained at S120. That is, the brake speed Vbrk is specified based on the vehicle speed before the accelerator-off operation is made by the driver. Specifically, the brake speed Vbrk is set to increase with an increase of the vehicle speed Vin. With this configuration, while the vehicle approaches the stop position, the deceleration of the vehicle may be carried out by the brake operation in a conformable manner with respect to a feeling of the driver. When the speed of the vehicle decreases equal to or lower than the brake speed Vbrk, the ECU 14 deactivates the regeneration increasing control. This is because the regenerated electric power cannot be adequately obtained when the speed of the vehicle decreases to a certain level. After the regeneration increasing control is deactivated, the ECU 14 may perform a normal regeneration control or may perform none control of the regeneration.

After the vehicle speed reduces to the brake speed Vbrk, the braking force needs to be generated. The braking force may be generated by the activation (depression) of the brake pedal by the driver. Alternatively, the braking force may be automatically generated in response to a command output from the ECU 14 to the brake. In a case where the braking force is generated by the operation of the driver, it is hard for the driver to depress the brake pedal at the exact time when the vehicle speed reduces to the brake speed Vbrk. However, the time error in this case may be omitted. This is because the driver checks the stop position by sight and adjusts the depression amount of the brake pedal for properly stopping the vehicle at the stop position.

As shown in FIG. 2, the brake position (BRK) is a position at which the vehicle speed is reduced to the brake speed Vbrk for properly stopping the vehicle at the stop position. Specifically, a brake distance is a distance necessary for the brake speed Vbrk to reduce to zero at a deceleration defined by the braking force. The braking force is generated by the activation of the brake by the driver. Then, a position that is positioned prior to the stop position by the brake distance is defined as the brake position.

At S140, the ECU 14 calculates a remaining distance Dbrk from the present position of the vehicle to the brake position BRK as shown in FIG. 2.

At S150, the ECU 14 calculates a remaining distance Dbrk_Aoff for calculating the accelerator-off notification time. Suppose that the vehicle travels at the entering speed Vin for a period T, the distance travelled during the period T at the speed of Vin is equal to VinxT. The remaining distance Dbrk_Aoff for calculating the accelerator-off notification time is obtained by subtracting the distance VinxT from the remaining distance Dbrk calculated at S140.

At S160, the ECU 14 acquires, from the navigation device, the slope information of the road surface from the present position to the stop position.

At S170, the ECU 14 calculates, with consideration of the slope of the road surface from the present position to the stop position, a deceleration of the vehicle in a case where the regeneration increasing control is carried out. Further, the ECU 14 calculates an estimated speed Vest of the vehicle after the vehicle travels the remaining distance Dbrk_Aoff for calculating the accelerator-off notification time at the deceleration calculated under the assumption that the regeneration increasing control is carried out.

The following will describe a calculation of the estimated speed Vest in details. In the present embodiment, the ECU 14 calculates the slope of the road surface and the vehicle speed for each predetermined unit distance from the present position. For example, the predetermined unit distance may be set to 20 meters. Herein, the slope of the road surface may be the average slope within each predetermined unit distance, and the vehicle speed may be the speed at the start point of each predetermined unit distance. Then, the ECU 14 calculates the deceleration of the vehicle for each predetermined unit distance under the assumption that the regeneration increasing control is carried out with reference to the calculated slope of the road surface and the calculated vehicle speed within the corresponding unit distance. A travel resistance may change according to the slope of the road surface and the vehicle speed, and the deceleration of the vehicle within the unit distance may correspondingly change according to the change of the travel resistance. Thus, the slope of the road surface and the vehicle speed need to be considered when calculating the deceleration of the vehicle. A braking torque generated by the regeneration increasing control may be set to maintain a certain level regardless of the vehicle speed or may be set to increase with an increase of the vehicle speed. Then, the ECU 14 calculates the speed of the vehicle after the travel of the unit distance using the calculated deceleration. By repeatedly calculating the speed of the vehicle after the travel of the unit distance, the ECU 14 can calculate the estimated speed Vest at a position prior to the brake position by the distance VinxT. As described above, the estimated speed Vest may be calculated at a high accuracy by repeatedly calculating the vehicle speed after travelling the unit distance with consideration of the road surface slope and the vehicle speed within each unit distance.

At S180, the ECU 14 compares the estimated speed Vest with the brake speed Vbrk, and determines whether the estimated speed Vest is equal to or higher than the brake speed Vbrk. For example, the ECU 14 may determine whether the estimated speed Vest is equal to the brake speed Vbrk. In this determination, when the estimated speed Vest is within an allowable range with the brake speed Vbrk as a reference, the ECU 14 may determine that the estimated speed Vest is equal to the brake speed Vbrk. The brake speed Vbrk is also referred to as a predetermined speed. As described above, the ECU 14 calculates the remaining distance Dbrk_Aoff for calculating the accelerator-off notification time by subtracting the distance VinxT from the remaining distance Dbrk from the present position to the brake position. As shown in FIG. 2, when the estimated speed Vest of the vehicle after travelling the remaining distance Dbrk_Aoff for calculating the accelerator-off notification time is equal to or higher than the brake speed Vbrk, the start point of the remaining distance Dbrk_Aoff, which is also the present position of the vehicle, is determined to be disposed prior to the position corresponding to the start time of the regeneration increasing control by the distance VinxT. In the driving assistance apparatus 10 according to the present embodiment, when the vehicle arrives at a point prior to the position corresponding to the start time T2 of the regeneration increasing control by the distance VinxT, the ECU 14 considers that the accelerator-off notification time T1 has come. At S180, when the estimated speed Vest is equal to or higher than the brake speed Vbrk, the ECU 14 proceeds to S190 and notifies the driver to turn off the accelerator by releasing the accelerator pedal. At S180, when the estimated speed Vest is lower than the brake speed Vbrk, the ECU 14 determines that the vehicle has not yet arrived at the position corresponding to the accelerator-off notification time T1 and returns to S140.

As described above, the ECU 14 performs the notification of the accelerator-off prior to the vehicle arrives at the position corresponding to the accelerator-off notification time T1. That is, the ECU 14 performs the notification of the accelerator-off at the position which is prior to the position corresponding to the start time T2 of the regeneration increasing control by the distance VinxT. The position corresponding to the accelerator-off notification time T1 is also referred to as a notification position, and the position corresponding to the start time T2 of the regeneration increasing control is also referred to as a start position of the regeneration increasing control. Thus, the response time for the driver to perform an operation for turning off the accelerator can be secured before the vehicle arrives at the position corresponding to the start time T2 of the regeneration increasing control regardless of the vehicle speed Vin.

At S200, the ECU 14 determines whether the predetermined period T has been elapsed from the accelerator-off notification time T1. When the ECU 14 determines that the predetermined period T has been elapsed from the accelerator-off notification time T1, the ECU 14 proceeds to S210. When the ECU 14 determines that the predetermined period T has not been elapsed from the accelerator-off notification time T1, the ECU 14 waits until the predetermined period T elapses from the accelerator-off notification time T1.

At S210, the ECU 14 determines whether the driver turned off the accelerator by releasing the accelerator pedal based on the depression amount detection signal acquired from the accelerator pedal sensor 12. When determining that the driver has turned off the accelerator by releasing the accelerator pedal, the ECU 14 proceeds to S220 and executes the regeneration increasing control. As a result, the regeneration increasing control is started at a time when the estimated speed Vest becomes equal to the brake speed Vbrk. When the ECU 14 determines that the drive has not turned off the accelerator, the ECU 14 determines that the driver has no intention to make a deceleration and ends the process shown in FIG. 3 without executing the regeneration increasing control.

In a known art, the position corresponding to the start time of the regeneration increasing control is specified based on a preliminarily defined relationship between the vehicle speed and the remaining distance to the stop position. In the driving assistance apparatus 10 according to the present embodiment, for each specified stop position, the start time of the regeneration increasing control is specified with consideration of the slope of the road surface and travelling environment of the vehicle. Thus, the regeneration increasing control can be started at a proper position and proper timing regardless of the change of the slope of the road surface of the travelling road.

The regeneration increasing control is executed when the predetermined period T has been elapsed from the accelerator-off notification time. That is, the regeneration increasing control is executed when the vehicle has travelled the distance VinxT from the position at which the accelerator-off is notified. When the driver is notified of the accelerator-off, the driver can estimate the start time of the regeneration increasing control in advance. Thus, when the regeneration increasing control is actually executed, the driver may sense less uncomfortable feeling caused by the regeneration increasing control.

As described above, in the driving assistance apparatus 10 according to the present embodiment, when the stop position ahead of the vehicle is detected and specified, for stopping the vehicle at the stop position, the predetermined position at which the speed of the vehicle should be reduced to the predetermined speed is calculated. The driving assistance apparatus 10 executes the regeneration increasing control with consideration of the slope of the road surface, and the deceleration distance for the vehicle to reduce the speed from the present speed to the predetermined speed is calculated. When the deceleration distance satisfies a predetermined condition with respect to the predetermined position, a start point of the deceleration distance is defined as the notification position where the notification of turning off of the accelerator is carried out to the driver. The driving assistance apparatus 10 executes the regeneration increasing control when the vehicle has travelled the distance that satisfies the predetermined condition from the notification position.

As described above, in the driving assistance apparatus 10 according to the present embodiment, the regeneration increasing control is carried out at the start point of the deceleration distance with consideration of the slope of the road surface when the end point of the deceleration distance is identical to the predetermined position. This is different from a known art in which the start point of the regeneration increasing control is carried out based on a preliminarily determined and stored relationship between the speed and the remaining distance. In the present embodiment, for each stop position, the start position of the regeneration increasing control is properly specified with consideration of the slope of the road surface and the travelling environment of the vehicle. Thus, the regeneration increasing control can be carried out at a proper position and proper timing regardless of the slope change of the road surface.

In the driving assistance apparatus 10 according to the present embodiment, when the end point of the deceleration point satisfies the predetermined condition with respect to the predetermined position where the speed of the vehicle reduces to the predetermined speed, the start point of the deceleration point is set as the notification position for notifying the turning off of the accelerator to the driver. After the vehicle has travelled the distance that satisfies the predetermined condition, the regeneration increasing control is carried out to increase the regenerated electric power. Thus, the time to start the regeneration increasing control is preliminarily notified to the driver, and the driver may feel less uncomfortable when the regeneration increasing control is activated.

In the present embodiment, the process executed by the ECU 14 at S110 functions as a position specifying unit, the process executed by the ECU 14 at S130 functions as a calculation unit, the process executed by the ECU 14 at S140, S150, S160, S170, S180 functions as a determination unit, the process executed by the ECU 14 at S190 functions as a notification unit, and the process executed by the ECU 14 at S200 and S210 functions as a regeneration control unit.

OTHER EMBODIMENTS

In the foregoing embodiment, with the present position of the vehicle as a reference, the estimated speed is calculated after the vehicle travels the remaining distance Dbrk_Aoff for calculating the accelerator-off notification time. When the estimated speed Vest is equal to or higher than the brake speed Vbrk, the apparatus 10 determines that the vehicle has arrived at the position corresponding to the notification time of the accelerator-off. As another example, with the brake position or the position before the brake position by the distance VinxT as the reference, the position at which the vehicle speed reduces to the brake speed Vbrk can be determined and the position corresponding to the notification time of the accelerator-off and the position corresponding to the start time of the regeneration increasing control can be determined based on the determined position at which the vehicle speed reduces to the brake speed Vbrk.

In the foregoing embodiment, the estimated speed Vest after travelling the remaining distance Dbrk_Aoff for calculating the accelerator-off notification time is obtained by repeated calculation of the vehicle speed within the unit distance. The estimated speed Vest may be calculated in a simplified manner. For example, the estimated speed Vest may be calculated based on the average slope of the road surface from the present position to the position that is prior to the brake position by the distance VinxT through one time calculation.

In the foregoing embodiment, the position corresponding to the accelerator-off notification time is apart from the position corresponding to the start time of the regeneration increasing control by the distance VinxT. As another example, the interval between the position corresponding to the accelerator-off notification time and the position corresponding to the start time of the regeneration increasing control may be set as a constant distance, or may be set to a variable value corresponding to the vehicle speed different from the distance VinxT.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A driving assistance apparatus, which executes a regeneration increasing control, comprising:
a stop position controller specifying a stop position, which is disposed on a travelling road ahead of a vehicle and requires a stop of the vehicle;
a calculator calculating a predetermined position at which a speed of the vehicle reduces to a predetermined speed for stopping at the stop position;
a microprocessor calculating a deceleration distance necessary for the vehicle to decelerate from a present speed to the predetermined speed taking into consideration of a slope of a surface of the travelling road and a regeneration increasing control is carried out after an accelerator of the vehicle is turned off, wherein the determination unit further determines a start point of the deceleration distance as a notification position when a distance between an end point of the deceleration distance and the predetermined position satisfies a predetermined condition, and the notification position is a position where a notification for turning off of the accelerator is to be carried out to a driver of the vehicle;
a notification controller notifying the driver to turn off the accelerator when the vehicle arrives at the notification position; and
a regeneration controller starting the regeneration increasing control when the vehicle has travelled the distance that satisfies the predetermined condition from the notification position, wherein the regeneration control unit executes the regeneration increasing control in response to the turning off of the accelerator in a case where the stop position is disposed ahead of the vehicle to increase an electric power regenerated by a deceleration of the vehicle compared with a case where the stop position does not exist ahead of the vehicle,
wherein
the distance between the end point of the deceleration distance and the predetermined position satisfies the predetermined condition when the distance between the end point of the deceleration distance and the predetermined position is equal to a product obtained by multiplying the present speed of the vehicle by a predetermined period, and
the regeneration control unit determines the vehicle has travelled the distance that satisfies the predetermined condition when the predetermined period has elapsed from a time when the notification for turning off of the accelerator is carried out to the driver, and then starts the regeneration increasing control.

2. The driving assistance apparatus according to claim 1, wherein
the microprocessor:
calculates the slope of the surface of the travelling road and the speed of the vehicle for each unit distance from a present position;
calculates the deceleration of the vehicle for each unit distance with consideration of the corresponding slope of the surface of the travelling road and the corresponding speed of the vehicle;
calculates the speed of the vehicle after the vehicle has travelled each unit distance based on a corresponding deceleration;
repeatedly calculates the speed of the vehicle for each unit distance;
calculates the speed of the vehicle at a position prior to the predetermined position by the distance that satisfies the predetermined condition; and
defines the distance from the present position to the predetermined position as a deceleration position when the calculated speed of the vehicle after the vehicle has travelled a certain unit distance becomes equal to or higher than the predetermined speed.

3. The driving assistance apparatus according to claim 1, wherein
the predetermined speed is set according to the speed of the vehicle before the accelerator is turned off by the driver.

4. The driving assistance apparatus according to claim 3, wherein
the predetermined speed is set to increase with an increase of the speed of the vehicle.

5. The driving assistance apparatus according to claim 3, wherein
the calculator calculates the predetermined position based on the stop position and the predetermined speed.

6. The driving assistance apparatus according to claim 1, wherein,
when the vehicle arrives at the predetermined position and the speed of the vehicle becomes equal to the predetermined speed, the regeneration controller deactivates the regeneration increasing control.

* * * * *